United States Patent Office 2,843,994
Patented July 22, 1958

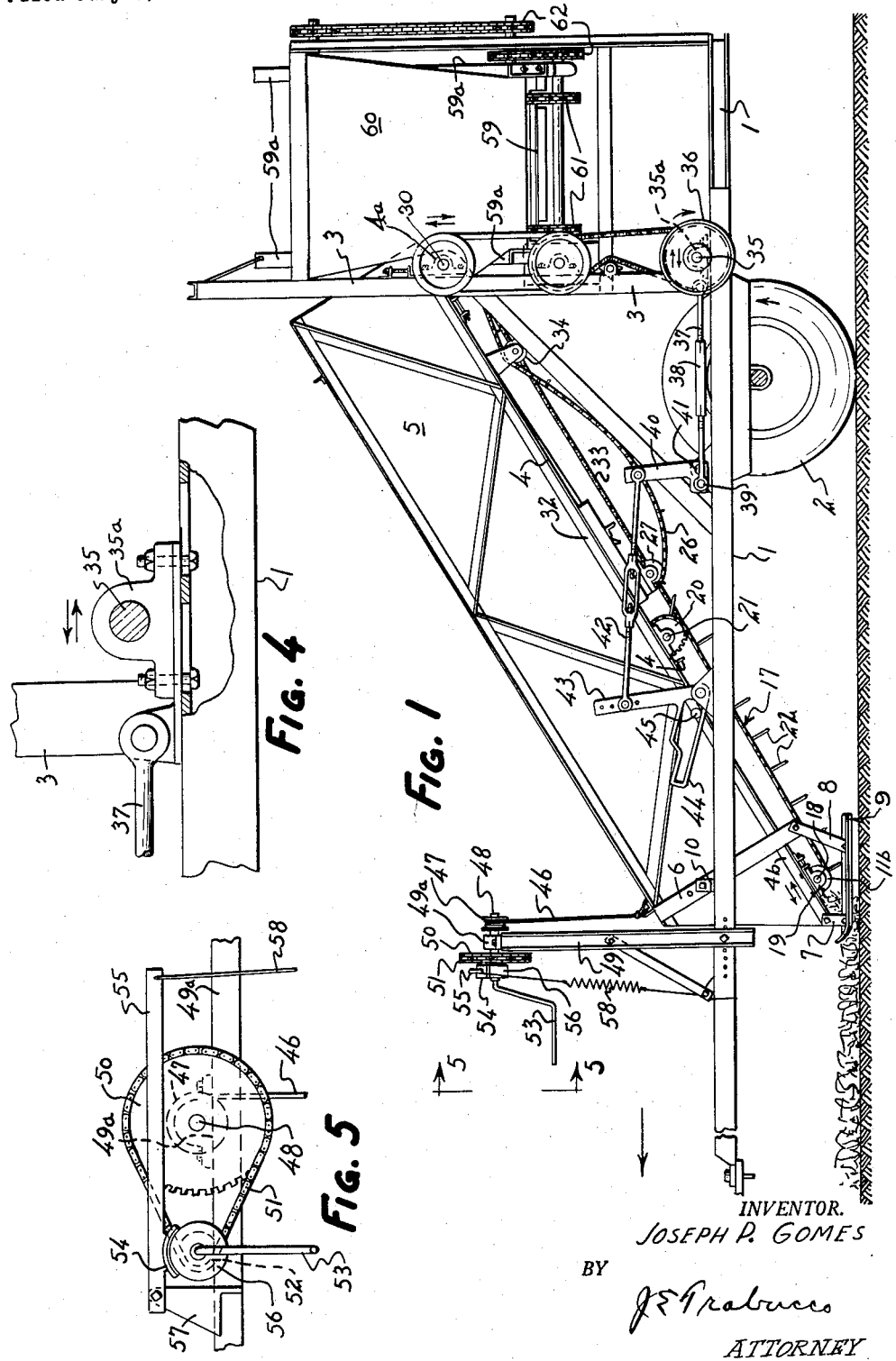

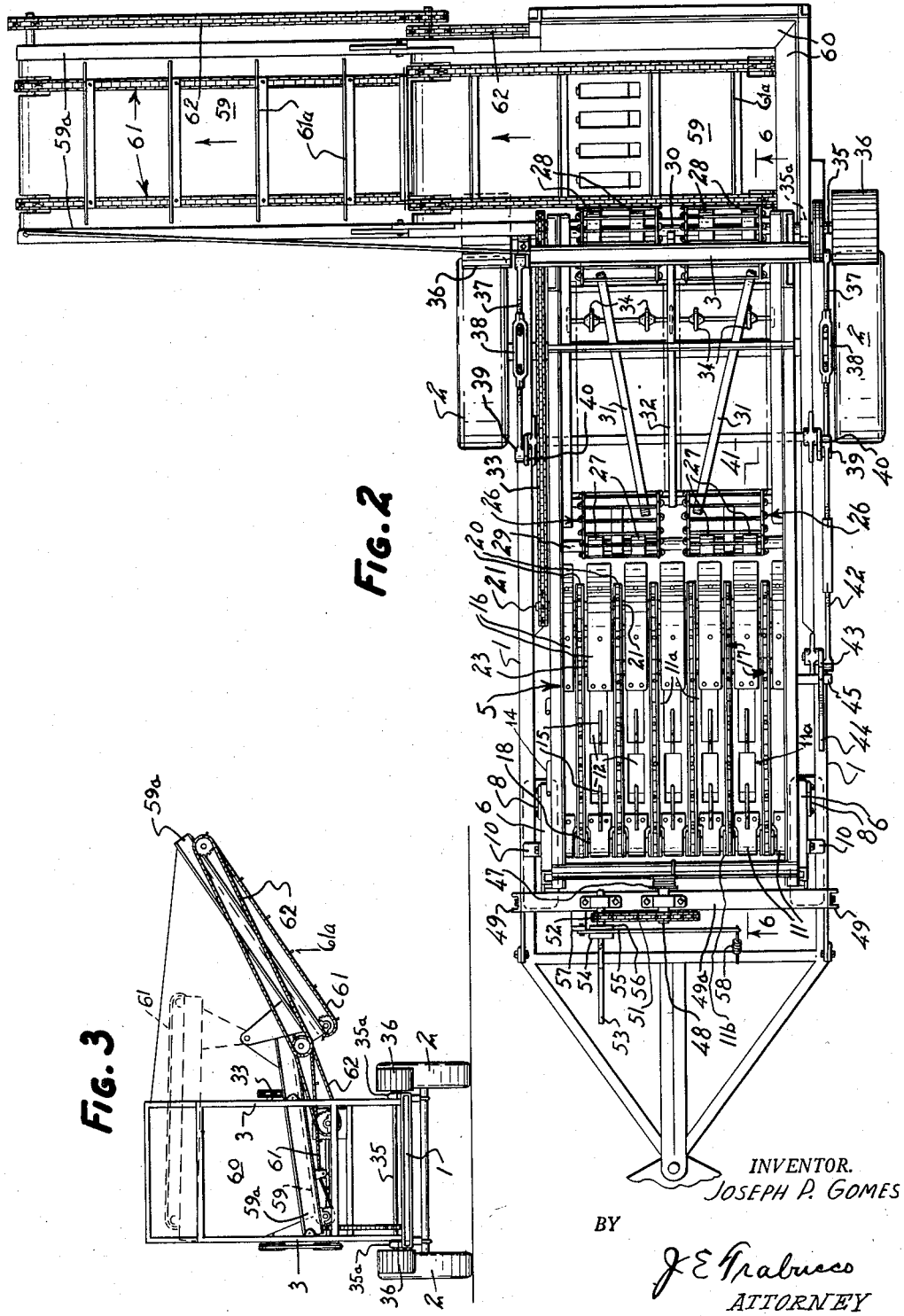

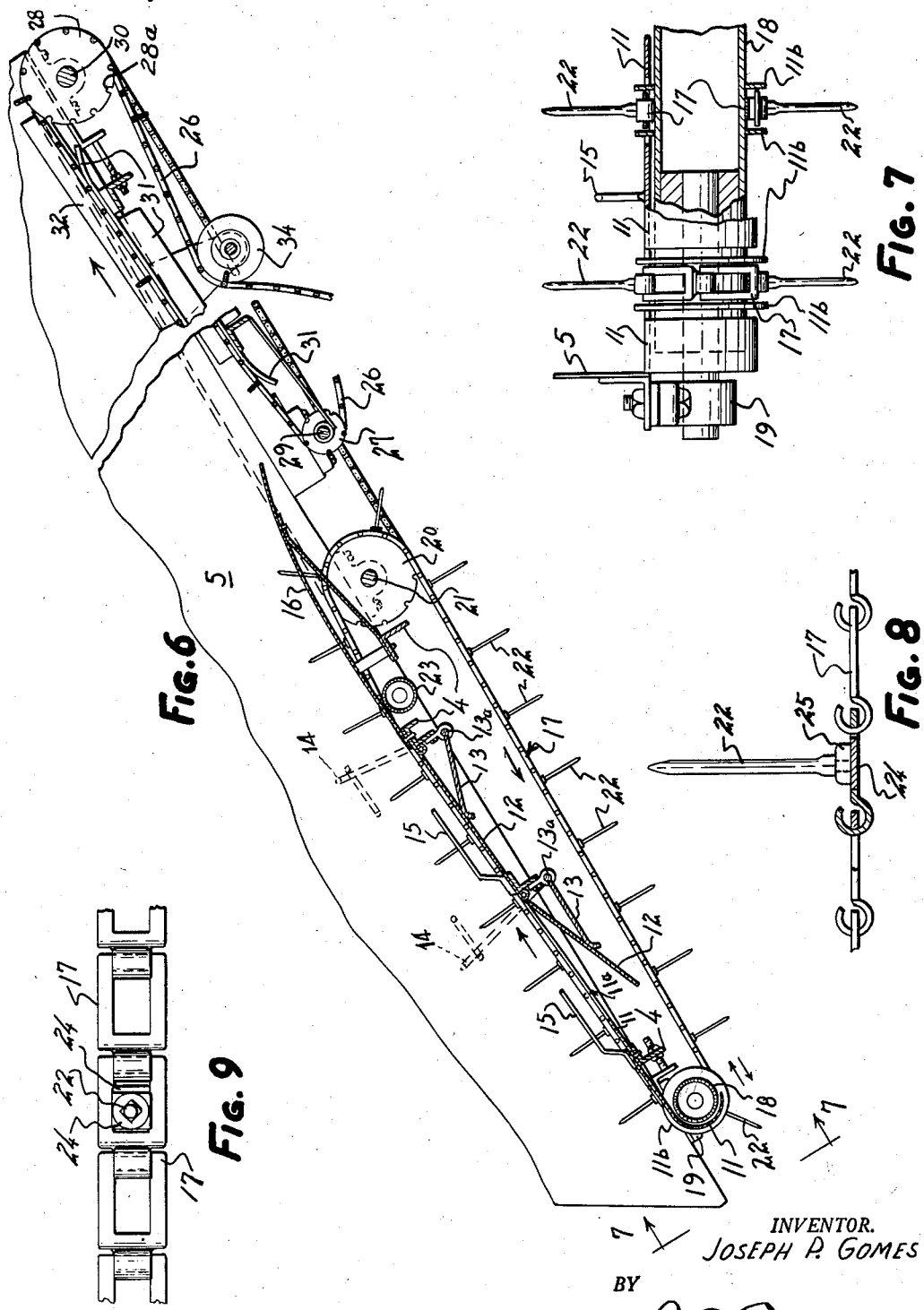

2,843,994

VEGETABLE TOP CLEANING MACHINE

Joseph P. Gomes, Greenfield, Calif.

Application July 6, 1956, Serial No. 596,181

4 Claims. (Cl. 56—345)

This invention relates to a field machine for clearing the tops of vegetables such as sugar beets.

The equipment now commonly used in harvesting sugar beets automatically performs the functions of up-rooting and picking up the beets, cutting the roots from the leafy tops and then discharging the roots into a receptacle and the tops onto the ground. The beet tops are later recovered for forage, but usually it is necessary to remove the loose dirt which is collected along with the beet tops before they are suitable for cattle feed. The cleaning operation required to condition the beet tops for use as forage is now quite involved, thereby increasing the ultimate costs of the beet tops to a point where they are not particularly competitive with most other kinds of cattle feed.

The present invention provides a field machine which automatically picks up the severed beet tops from the ground beneath and subjects them to a mechanical cleaning treatment designed to condition them for suitable cattle feed by separating and removing the loose dirt therefrom. The machine embodies a combined pick-up means and conveyor which operates as the machine advances to lift the beet tops from the ground and convey them by means of an apertured conveyor over an apertured bed through which the loose dirt separated from the beet tops is adapted to fall. The beet tops when picked up from the ground and conveyed upwardly toward a point of discharge are agitated sufficiently to dislodge most of the dirt adhering to and mixed therewith, thereby conditioning such beet tops for consumption by cattle and other animals.

The primary object of my invention is to provide a novel field machine for cleaning beet tops or the like, one which is adapted to remove loose dirt and other foreign material adhering to and mixed therewith.

Other and further objects and advantages of my invention will be pointed out hereinafter or will be indicated in the appended claims, or will be obvious to one skilled in the art upon an understanding of the present disclosure. For the purpose of this application, I have elected to show herein certain forms and details of a vegetable top cleaning machine representative of my invention; it is to be understood, however, that the embodiment of my invention shown and described herein is for purposes of illustration only and that therefore it is not to be regarded as exhaustive of the variations of the invention in the art.

In the accompanying drawings:

Fig. 1 is a side elevation of a vegetable top cleaning machine embodying my invention, showing one of the ground wheels removed;

Fig. 2 is a top plan view of the machine;

Fig. 3 is a rear elevational view on a reduced scale of the machine;

Fig. 4 is an enlarged detailed view showing the adjustable shaft supporting means mounting the take-off drum which engages with a ground wheel to actuate the pick-up means and conveyors;

Fig. 5 is an enlarged detail taken on the line 5—5 of Fig. 1, showing the means for lowering and raising the forward end of the sub-frame and for effecting the engagement and disengagement of the take-off drum with respect to its associated ground wheel;

Fig. 6 is a sectional view on a reduced scale taken on the line 6—6 of Fig. 2;

Fig. 7 is an enlarged end view of a part of the pick-up-conveyor mechanism, showing parts broken away and in section;

Fig. 8 is an enlarged side elevation, partly in section, of a part of the pick-up means and conveyor;

Fig. 9 is a plan view of a part of the pick-up means and conveyor.

Referring to the drawings, the numeral 1 designates a main supporting frame mounted at its rear end on a pair of supporting ground wheels 2, 2 equipped with rubber tires and connectable at its forward end to a towing vehicle. The main supporting frame comprises substantially parallel side members as well as transverse members, all welded to one another to form a rigid supporting structure. Secured to the side members of the main supporting frame toward the rear end thereof are a pair of opposed upright posts 3 on which the rear end of an adjustable inclined sub-frame 4 is pivotally supported as at 4a. The sub-frame 4 is substantially rectangular and carries enclosing opposed longitudinal upright sides 5 which prevent the lateral displacement of the beet tops as they are conveyed upwardly, as will be later described. Secured rigidly to the forward end portion 4b of the sub-frame 4 are opposed upstanding side frame members 6 which are disposed approximately at right angles to the sub-frame. Secured as by pivoted links 7 and 8 to the forward ends of each of the side members of the sub-frame 4 and the lower ends of the side frame members 6, respectively, are a pair of ground engaging shoes 9 which are adapted to support the forward end of the sub-frame when the ground is uneven. The shoes 9 are arranged to prevent the dipping of the forward end of the sub-frame to an extent which might damage the pick-up spikes, as will be later mentioned. In addition to providing supports for the links 8, the side frame members 6 also provide rigid supports for the sides 5. Secured to the side frame members 6 are outwardly disposed members or lugs 10 which normally rest on the parallel side members of the main frame 1 and thereby normally support the forward end of the sub-frame 4 in a suitable operating position. When, in the operation of the machine, the shoes 9 encounter a furrow or rise in the ground surface and are thereby lifted upwardly, the forward end of the sub-frame is also raised, and in such an event the outwardly disposed members or lugs 10 are also lifted above the side frame members 1, but such members again engage with the frame members when the shoes pass over the rise in the ground surface.

Supported on the sub-frame 4 is an inclined bed 11 which is provided with a plurality of laterally spaced openings 11a, preferably of rectangular shape. The lower forward end of the bed is formed with a downwardly curved portion. The openings 11a are arranged in transverse rows, and they are normally open to allow dirt or other foreign material which becomes separated from the beet tops being conveyed up the bed to fall therethrough. Each transverse row of openings 11a is controlled by a row of hinged doors 12, such row of doors being closed by means of a row of levers 13 secured to a transverse rotatable operating rod 13a mounted on the sub-frame 4 beneath the bed 11. An upstanding control handle 14 secured to each operating rod 13a is positioned in an accessible location for manual control and operation. Thus when the operating rod 13a is turned by its associated handle 14 in a clockwise direction (Fig. 6), the doors 12 associated with such operating rod are closed. A reverse movement of the operating rod will release the upward pressure of the associated levers 13 on the doors 12 and allow the latter to drop downwardly to open positions. Suitable means (not shown) may be associated with the control handles 14 to normally maintain them at either of their extreme adjusted positions. The doors 12 are provided so as to make it possible to control the openings 11a whenever it becomes necessary because of the size of the vegetable tops or when such vegetable tops carry a larger or a less amount of dirt or other foreign particles. Secured to the inclined bed 11 are a plurality of spaced bars 15 which extend upwardly and rearwardly in elevated positions above the openings 11a, such bars being adapted to encounter and assist in the agitation of the beet tops as they are conveyed upwardly over the inclined bed, and such bars being also arranged to prevent the beet tops from dropping through the openings 11a. The inclined bed 11 has a rearwardly disposed extension which comprises a number of spaced extension plates 16 secured to the rear end of the bed 11. The extension plates curve downwardly at their rear end portions. The bed and the extension plates 16 are suitably supported on the sub-frame 4.

Mounted for movement over the bed 11 are a plurality of uniformly spaced endless conveyor chains 17 which extend longitudinally across the bed in parallel relationship, such chains extending between the rectangular openings 11a. The endless chains engage with and extend over a rotatable drum 18 which is mounted on the forward end of the sub-frame 4 in bearings 19. The chains 17 are prevented from becoming laterally displaced where they extend over the curved forward end portion of the bed by lugs 11b which are secured to the said curved portion of the bed. The chains 17 engage with and extend over individual sprockets 20 which are keyed to a rotatable shaft 21 mounted in bearings secured to the rear end portion of the sub-frame. The endless chains 17 move in clockwise directions (Fig. 1), and each carries a number of outwardly projecting spikes or pointed members 22 which are adapted to pick up the beet tops from the ground and transfer them onto the bed 11 and then carry or push them rearwardly, over the bed and its extension plates 16, to a point of discharge. The endless chains 17 extend between the extension plates 16, and the spikes 22 cause the beet tops to be carried rearwardly so they will be progressively discharged from such plates. Loose dirt and other foreign material which might still be attached to or carried by the beet tops when they reach the plates 16 will be able to fall downwardly through the spaces between such plates as the beet tops are carried rearwardly thereover. As the spikes 22 dip downwardly between the forwardly disposed curved ends of the plates 16, any beet tops attached to the spikes will be released and will slide forwardly and downwardly from the said plates. So as to prevent the sagging of the upper flight of the chains 17, a wide roller or drum 23 is mounted transversely on the sub-frame 4 beneath the chains. As shown in Figs. 8 and 9, the endless chains 17 carry plates 24 to which are welded nuts 25, and to the latter the spikes 22 are secured.

The beet tops are discharged from the extension plates 16 onto parallel endless conveyors 26 each of which comprises a number of closely spaced bars connected at their ends to form endless conveyors. The endless conveyors 26 extend over pairs of wide sprockets 27 and 28, which have spaced peripheral grooves 28a which are adapted to receive the spaced bars of the conveyors. The sprockets 27 are secured to a rotatable shaft 29, which is supported on the sub-frame 4, and the sprockets 28 are keyed to a powered drive shaft 30, which is also journaled on the sub-frame. The upper flight of the endless conveyor 26 rides over and is supported in an inclined plane by elongated supporting members 31, which are supported on the sub-frame 4. The conveyors 26 allow loose dirt and other foreign material which might still be carried by the beet tops to fall through the openings between the bars of such conveyors, but such bars are sufficiently close to one another to prevent any appreciable percentage of the beet tops from being lost. Arranged at the sides of the conveyors 26 and mounted on the sub-frame 4 are longitudinal upstanding side members 32 which normally prevent the beet tops from falling from the side edges of the conveyors as they are carried upwardly thereon. Keyed to the shafts 21 and 30 are suitable sprockets which are connected by a drive chain 33. The lower flights of the conveyors 26 rest on and slide over an elongated transverse drum 34 which is supported by the sub-frame 4 and is arranged to prevent the said lower flights of the conveyors from sagging.

Suitable means of the usual kind are provided for adjusting the shafts, sprockets and rollers on which the various conveyors and drive chains are mounted so as to provide suitable tensions and the like for such chains and conveyors.

The drive means for the conveyors is connected to the ground wheels 2, and only when the machine is moving forwardly will the pick-up spikes and the conveyors be actuated to pick up the beet tops and convey them upwardly. Keyed to a drive shaft 35 rotatably supported on the main frame 1 and which is mounted for movement toward and away from the ground wheels 2 are driving drums 36. As shown in Fig. 4, the shaft 35 is rotatably supported in slidable bearing members 35a, which are mounted for forward and rearward adjustment on the main frame 1. When the shaft 35 is adjusted forwardly, the driving drums 36 are brought into driving engagement with the peripheries of the rubber tired ground wheels 2, and when the shaft is adjusted rearwardly, the driving drums 36 are disengaged from the ground wheels. The shaft 35 is operatively connected in the usual manner by a series of sprockets, drive chains, pulleys and belts to the shaft 30, thereby providing a driving connection from the driving drums 36 for the operation of the conveyors 17 and 26.

Connected to the slidable bearing members 35a which carry the drive shaft 35 are similar rods 37 on opposite sides of the frame 1, which are provided with turnbuckles 38. The rods 37 are each pivotally connected as at 39 to a lower arm of an L-shaped lever member 40, which is mounted on a transverse rod 41 supported on the main frame 1. The upwardly disposed longer arm of one of the lever members 40 is connected by a rod 42 to the upper end of a cam bar 43, which is pivotally mounted at its lower end on the frame 1. The lower end of the cam bar 43 is formed with an integral forwardly disposed cam 44, which is internally engaged by a pin 45 secured to and projecting laterally to the sub-frame 4. The pin 45 extends into the cam 44 and engages with the internally disposed cam surface thereof. When the forward end of the sub-frame 4 is lowered, the cam bar 43 is swung forwardly by the pressure exerted forwardly and downwardly by the pin 45 on the cam 44, thereby causing the shaft 35 to be shifted forwardly so as to bring the driving drums 36 into operative engagement with the ground wheels 2. When the forward end of the sub-frame is lowered, the spikes 22 carried by the endless chains 17 are positioned for engagement with the beet tops resting on the ground beneath. When the forward end of the sub-frame 4 is raised sufficiently to disengage the spikes from the ground beneath, the projecting pin 45 carried by the sub-frame engages with and exerts an upward and rearward pressure on the cam member 44, thereby swinging the cam bar 43 rearwardly and causing the driving drums 36 to become disengaged from the ground wheels 2. The cam member 44 is so shaped that even though the ground shoes 9 encounter a rise in the ground surface and temporarily lift the forward end of the sub-frame upwardly, the cam bar 43 will not be swung rearwardly to cause the disengagement of the driving drums 36 from the ground wheels 2. The upward and downward movement of the projecting pin 45 within the cam member 44 without causing the movement of the cam member and its cam bar 43 is made possible by widening the cam surfaces near the inner end portion thereof, as shown in Fig. 1.

The driving drums 36 are brought into and out of engagement with the ground wheels by lowering and raising the forward end of the sub-frame 4. A cable 46 connected at one end to the lower forward end of the sub-frame is secured to and extends around a drum 47 secured to a shaft 48, which is mounted for rotation on a cross member 49a secured to two (2) upright posts 49 of the main frame 1. Keyed to the shaft 48 is a large gear 50, which is connected by a drive chain 51 to a small gear 52 secured to a shaft having a crank 53 connected thereto. A brake shoe 54 mounted on a pivoted arm 55 engages the periphery of a friction wheel 56 secured to the shaft of the crank 53. The pivoted arm 55 is pivotally supported at one end on a bracket 57 secured to the cross member 49a, and a spring 58 connected to the other end of such arm and to the main frame normally exerts sufficient downward pressure on the arm to hold the brake shoe 54 in rotation preventing engagement with the friction wheel 56, thereby normally supporting the forward end of the sub-frame 4 when it has been raised by turning the crank 53 sufficiently to wind the cable 46 on the drum 47. By manually releasing the tension of the spring 58, the forward end of the sub-frame 4 drops downwardly until the lugs 10 again rest on the main frame 1, and when so positioned the endless chains 17 and the endless conveyors 26 are in readiness to operate and move in clockwise directions (Fig. 6) as the machine is towed forwardly.

When the beet tops have been conveyed to positions whereby they are discharged from the upper ends of the conveyors 26, they fall onto a bed 59, which is supported on upright frame members constituting a part of the main frame 1. The inner section of the bed 59 is provided with an enclosure 60, which prevents the beet tops from falling onto the ground below. An endless conveyor comprising endless side chains 61 and transverse spaced raised angle irons or bars 61a connected thereto, moves over the bed 59 at right angles to conveyors 26 and conveys the beet tops to the end of such bed where they either drop to the ground beneath to be sun dried or are discharged into a vehicle or other container positioned to receive them. The conveyor 61—61a and its side frame members 59a on which the chain sprockets are mounted are made in two (2) articulated sections which are connected together by suitable pivot means, and for convenience in transportation the outer section is adapted to be swung inwardly to a position overlying the inner lower section, as shown by the broken lines in Fig. 3. Suitable chain and sprocket drive means 62 connected to the drive shaft 30 are connected to the shafts on which the sprockets engaged by the side chains 61 are secured, and when compacting the discharge means the chains are removed from their sprockets.

What I claim is:

1. A vegetable top cleaning machine comprising a main supporting frame having supporting ground wheels, an inclined sub-frame pivotally mounted at its upper rear end on the main frame, the forward end of the sub-frame being adjustable upwardly and downwardly, an inclined vegetable top supporting bed mounted on the sub-frame and having a plurality of laterally spaced apertures therein, adjustable members positioned beneath the bed and arranged to close the apertures in the bed when in one of their adjusted positions, a plurality of endless conveyor chains arranged in substantially parallel relationship and mounted for upward movement over the bed, a plurality of projecting spikes carried by the chains and arranged to engage with and pick up loose vegetable tops from the ground beneath when the forward end of the sub-frame is in a downwardly adjusted position and as the machine moves forwardly, the said spikes being adapted to carry the vegetable tops onto the bed and upwardly over the same, an apertured endless conveyor mounted on the sub-frame and arranged to receive vegetable tops discharged by the spikes from the bed, means supported on the main frame and connected to the forward end of the sub-frame for adjusting upwardly and downwardly the lower end of the sub-frame, a driving shaft mounted on the main frame and arranged for adjustment toward and away from the ground wheels, driving drums keyed to the driving shaft and arranged to operatively engage with the ground wheels when the driving shaft is adjusted toward such ground wheels, means connecting the driving shaft and the forward end of the sub-frame whereby when the forward end of the sub-frame is adjusted downwardly the driving drums will operatively engage with the ground wheels, and means synchronized with the driving shaft and the endless chains and the endless conveyor for simultaneous operation thereof.

2. A vegetable top cleaning machine comprising a main supporting frame, a pair of supporting ground wheels mounted on the main frame, an inclined sub-frame pivotally supported at its upper rear end on the main frame, the lower forward end of the sub-frame being adjustable upwardly and downwardly, an inclined vegetable top supporting bed mounted on the sub-frame and having a plurality of openings therein, adjustable closure means for the openings, a plurality of endless conveyor chains arranged in substantially parallel relationship and mounted for upwardly movement over the bed, a plurality of projecting spikes carried by the conveyor chains and arranged to engage with and pick up loose vegetable tops from the ground beneath when the forward end of the sub-frame is in a downwardly adjusted position and the machine travels forwardly, the spikes being adapted to carry the vegetable tops onto the bed and upwardly over the same to a discharge point, an apertured endless conveyor mounted on the sub-frame and arranged to receive the vegetable tops discharged by the spikes from the bed and convey the vegetable tops to a point of discharge, means supported on the main frame and connected to the forward end of the sub-frame for adjusting the lower forward end of the sub-frame upwardly and downwardly, a drive shaft mounted on the main frame and arranged for adjustment toward and from the ground wheels, driving drums keyed to the driving shaft and arranged to operatively engage with the ground wheels when the driving shaft is adjusted toward the ground wheels, means connecting the driving shaft and the forward end of the sub-frame whereby when the forward end of the sub-frame is adjusted downwardly the driving drums will operatively engage with the ground wheels, and means synchronized with the driving shaft and the endless conveyor chains and the endless conveyor for effecting the simultaneous operation thereof as the machine travels forwardly.

3. A vegetable top cleaning machine comprising a main supporting frame mounted on ground wheels for movement over ground having vegetable tops thereon, an inclined sub-frame pivotally supported at its upper rear end on the main frame and arranged so its forward lower end is adjustable upwardly and downwardly, an endless conveyor mounted on the sub-frame having a plurality of spikes adapted to engage with and pick up vegetable tops from the ground beneath and convey such vegetable tops rearwardly to a point of discharge, an apertured conveyor mounted on the sub-frame and arranged to receive the beet tops discharged from first mentioned conveyor and convey such vegetable tops rearwardly to a point of discharge, a drive shaft mounted on the main frame for adjustment forwardly and rearwardly, a driving drum keyed to the shaft and engageable with the periphery of a ground wheel when the shaft is adjusted forwardly, and means connecting the driving shaft and sub-frame whereby when the forward end of the sub-frame is adjusted downwardly the shaft is adjusted forwardly to bring the driving drum into operative engagement with a ground wheel, and connecting means synchronizing the operation of the shaft and the conveyors.

4. A vegetable top cleaning machine comprising a main supporting frame mounted at its rear end on ground wheels, a rearwardly inclined sub-frame pivotally mounted at its upper end on the main frame and arranged for upward and downward adjustment of its forward end, means normally supporting the lower forward end of the sub-frame on the main frame, a pair of ground engaging shoes carried by the lower end of the sub-frame and arranged to engage with the ground beneath when the machine encounters a depression in the ground surface, endless chain conveyors mounted on the sub-frame and having pointed members arranged to pick up vegetable tops from the ground and convey them upwardly and rearwardly to a point of discharge, the pick-up members being engageable with the ground when the sub-frame is in a downwardly adjusted position, an apertured conveyor mounted on the sub-frame and arranged to receive the vegetable tops discharged by the chain conveyors and to convey such vegetable tops to a point of discharge, a drive shaft mounted for forward and rearward adjustment on the main frame, a driving drum keyed to the shaft and arranged to operatively engage with a ground wheel when the shaft is adjusted forwardly, means supported on the main frame and connected to the forward end of the sub-frame for adjusting the forward end of the sub-frame upwardly and downwardly, means connecting the drive shaft and the sub-frame whereby when the forward end of the sub-frame is adjusted downwardly the shaft is adjusted forwardly, and connecting means synchronizing the shaft and the conveyor chains and the apertured conveyor.

References Cited in the file of this patent

UNITED STATES PATENTS

| | | |
|---|---|---|
| 743,008 | Low | Nov. 3, 1903 |
| 1,119,422 | Gould et al. | Dec. 1, 1914 |
| 2,629,223 | Russell | Feb. 24, 1953 |
| 2,796,722 | Hanford et al. | June 25, 1957 |